US007591616B1

(12) United States Patent
Kerner

(10) Patent No.: US 7,591,616 B1
(45) Date of Patent: Sep. 22, 2009

(54) DRILL BIT HOLDER ATTACHMENT

(76) Inventor: Ryan Kerner, 128 Grover Ave., Trenton, NJ (US) 08610

( * ) Notice: Subject to any disclaimer, the term of this patent is extended or adjusted under 35 U.S.C. 154(b) by 401 days.

(21) Appl. No.: 11/228,611

(22) Filed: Sep. 19, 2005

(51) Int. Cl.
*B23B 45/00* (2006.01)

(52) U.S. Cl. .................... 408/124; 408/241 R; 206/379

(58) Field of Classification Search ................... 408/16, 408/124, 241 R; 206/372, 377, 378, 379; 81/177.4, 490; 211/69
See application file for complete search history.

(56) References Cited

U.S. PATENT DOCUMENTS

| | | | | |
|---|---|---|---|---|
| 2,842,260 | A * | 7/1958 | Molitor | 206/379 |
| 4,240,771 | A * | 12/1980 | Derbyshire | 408/124 |
| 4,579,356 | A * | 4/1986 | Welborn | 279/149 |
| 4,932,294 | A * | 6/1990 | Chang | 81/490 |
| 4,934,223 | A * | 6/1990 | Wong | 81/490 |
| 4,954,026 | A * | 9/1990 | Zurwelle | 408/241 R |
| 4,973,205 | A | 11/1990 | Spaulding | |
| 5,035,553 | A | 7/1991 | Lo | |
| 5,188,242 | A * | 2/1993 | Smith | 211/69 |
| 5,445,479 | A * | 8/1995 | Hillinger | 408/16 |
| 5,813,805 | A * | 9/1998 | Kopras | 408/241 R |
| 6,302,409 | B1 | 10/2001 | Gutsche | |
| 6,334,743 | B1 * | 1/2002 | Liao | 408/16 |
| 6,702,530 | B2 | 3/2004 | Bennage et al. | |
| 6,752,268 | B1 | 6/2004 | Wadsworth | |
| 6,761,095 | B2 | 7/2004 | Beauchamp | |
| 6,964,545 | B1 * | 11/2005 | Languasco | 408/16 |
| 2004/0069099 | A1 | 4/2004 | Bai | |
| 2004/0139831 | A1 | 7/2004 | Nagy | |
| 2005/0249564 | A1 * | 11/2005 | Van Bergen et al. | 408/241 R |

FOREIGN PATENT DOCUMENTS

| | | | | |
|---|---|---|---|---|
| DE | 3514023 | A1 | * | 10/1986 |
| GB | 1544082 | A | * | 4/1979 |
| GB | 2397513 | A | * | 7/2004 |
| JP | 04331080 | A | * | 11/1992 |

* cited by examiner

OTHER PUBLICATIONS

Ryobi Duo Screw Guide Set, Product No. R2009, 2003.
Black & Decker Drill Bit Holder, 2003.

*Primary Examiner*—Daniel W Howell
(74) *Attorney, Agent, or Firm*—William L. Muckelroy; Art Lessler; Gary Lipson

(57) ABSTRACT

A detachably mountable hand drill tool bit holder and static tool presenting apparatus holds a plurality of bits for use with a hand drill tool. The apparatus comprises a horizontally oriented oblong oval shaped receptacle with two parallel sides forming an aperture for receiving and frictionally engaging tool bits. The apparatus is made of a resilient rubber or rubber-like material. The bottom is shaped to be inserted and frictionally engaged by a slot formed in the hand drill tool. The top of the apparatus allows ends of tool bits to extend outward so that each bit is presented and can be easily grabbed for use. Bits are returned to the holder by inserting anywhere there is unoccupied space in the holder by forcing the bit into the space. The size of the holder's oblong oval shaped receptacle is selected to exhibit a width between the two parallel sides that is significantly less than the diameter of the smallest bit. In addition, to insure that the bits remain in place, the wall of the receptacle is lined with a more resilient liner having an inner surface and an outer surface and a thickness and outer perimeter sufficient to engage the wall of the receptacle and an inner surface sufficient when pressed inside the receptacle to frictionally engage the bits inserted therein and release them when pulled out.

12 Claims, 3 Drawing Sheets

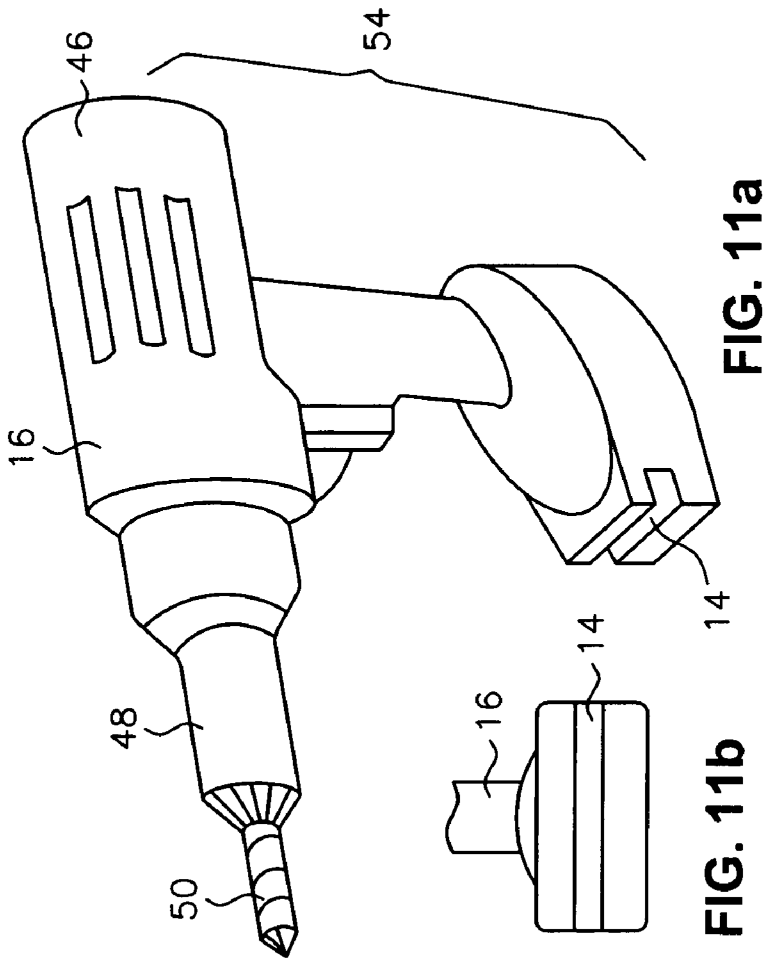
FIG. 11a
FIG. 11b
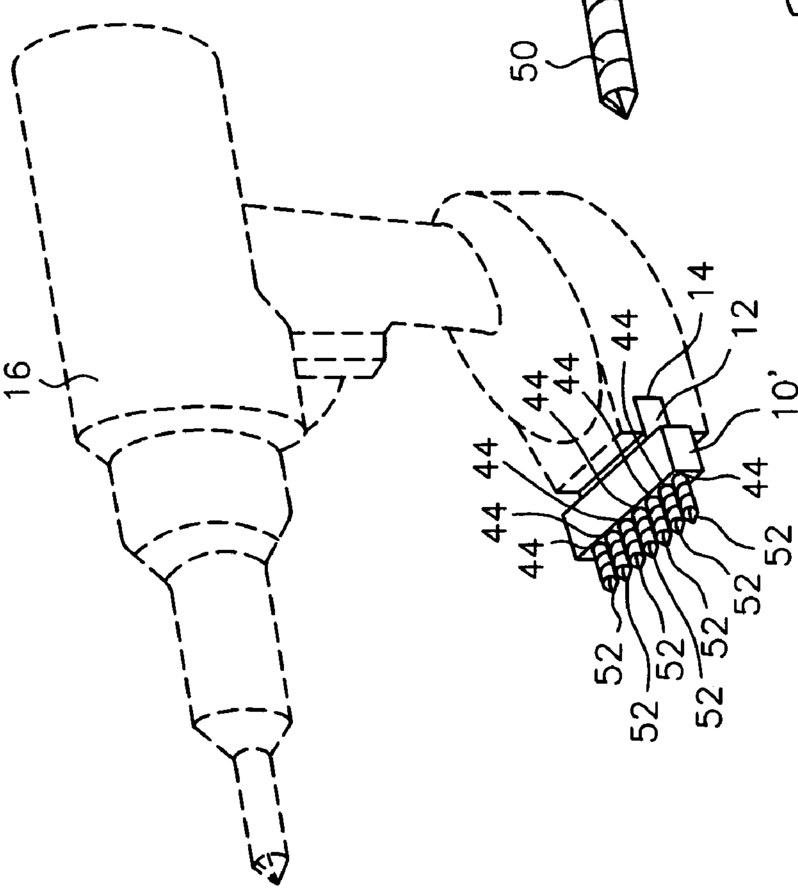
FIG. 10

DRILL BIT HOLDER ATTACHMENT

PRIORITY DATE CLAIMED

None.

BACKGROUND OF THE INVENTION

1. Field of the Invention

In general the novel invention is directed to an improved structure for a portable drill bit storage rack wherein drill bits are inserted for storage between uses. The overall drill bit storage rack is provided with a frictional engagement sleeve that retains the bits in a single row but which allows selective removal of a drill bit from the storage rack. In particular, the present invention relates specifically to an ergonometrically improved tool bit holder and presenter apparatus that stores bits side-by-side.

2. Description of the Prior Art

Workers, especially electricians, must often work in areas in which it is difficult to get to a tool chest. These same workers, however, must often perform a variety of functions, each requiring a different tool or a different tool bit. Workers, therefore, generally carry a multiplicity of tools in a tool belt or tool kit. Even the most skilled worker, however, looses time removing and inserting tool bits in his belt. Workers also loose time searching for lost tools that they have set down at different locations. Furthermore, a tool belt with all the necessary tools can become quite disorganized leading to increased worker fatigue and more inefficient use of time. It is desirable, therefore, to have a single tool bit holder that can be detachably affixed to a power drill or other power hand tool that utilizes different bits. Prior art attempts at providing such a bit holder resulted in a structure that made it difficult to grasp individual bits because the bits were arrayed in a matrix or in a circular pattern around a chuck. This arrangement makes it difficult to grasp a bit with two opposing fingers and remove it. In addition, the circular arrangement as well as arrangements that have individual apertures and holes in which to insert bits after use are cumbersome to use and difficult for a worker wearing work gloves to efficiently insert the bits.

U.S. Pat. No. 4,973,205, which issued to Spaulding on Nov. 27, 1990 provides a bit holding apparatus wherein a hand drill includes a conventionally configured elongate housing with an elongate orthogonally extending handle relative thereto, with a forwardly mounted collet to receive drill bits therewithin. The apparatus further includes a transparent drill bit housing pivotally mounted to an upper surface of the central housing body of the drill formed with a snap-fit cover to receive drill bits in a convenient and accessible manner. A bifurcated chuck-key holder includes resilient legs defining a slot to resiliently secure a chuck-key therewithin.

On Jul. 30, 1991 U.S. Pat. No. 5,035,553 issued to Lo for an improved drill bit storage rack which allows for the user to insert the drill bit into the drill bit storage rack by grasping the handle portion of the drill bit. In this manner, the user's hand is protected by holding the drill bit by the handle portion and not being either cut or burned by grasping the drill bit blade. The two major drawbacks with this structure are that it is difficult to identify the bit needed when retrieval is necessary and nowadays workers use work gloves to protect their hands.

On Jun. 22, 2004 Wadsworth further advanced the art with U.S. Pat. No. 6,752,268 for a magnetically holdable drill bit. This patent teaches an invention to provide a quick-change tool element wherein at least two or more working tools are simultaneously attracted, held and served by a magnet to prevent loss of tool bits from the chuck of a hand drill where the grip of the jaws has somewhat slackened. Wadsworth brings a magnetized bit into contact with the interior of the drill, while simultaneously holding a screw or other object by magnetism at the other, exposed end of the tool element. A few weeks later on Jul. 13, 2004 Beauchamp received U.S. Pat. No. 6,761,095 for a bit holder arrayed circularly around the drill shaft. The Beauchamp bit holder is (a) a shaft adapted at one end for releasably mounting to the drill chuck, and at the other end for releasably mounting tool bits therein; and, (b) a circular storage rack for releasably storing tool bits in a nested fashion around the shaft such that the drill shaft and the nested storage rotate in unison with the drill chuck.

U.S. Patent Publication 0139831 published on Jul. 22, 2004 by Nagy teaches a tool for housing and supplying bits through an elongated tube of a screw driver or drill to a forward presentation for use. The housing has a rotatable storage holder mounted in the housing for holding and storing a plurality of tool bits and arranged by manual engagement with an exposed side portion to rotate about a second axis parallel to the tube. The rotatable holder has a plurality of receptacles each for receiving a respective one of the tool bits arranged parallel to the second axis and in angularly spaced relation around the second axis.

OBJECTS OF THE INVENTION

A primary object of the invention is to provide a receptacle and for receiving a single line linear array of bits wherein each bit can be inserted anywhere in the receptacle with two opposite fingers without having to line up the bit to a particular hole or aperture.

It is another object of the present invention to provide a bit presenter for presenting a single line linear array of bits wherein each bit can be grasped with two opposite fingers and removed without interference from surrounding bits.

It is still another object of the present invention to provide a portable drill bit receptacle for frictionally holding a plurality of bits wherein the receptacle frictionally and releasably engages a slot in the portable drill shaped to receive the receptacle.

It is yet another object of the present invention to provide a novel structure for a single hole in a holder that enables the single hole to receive and frictionally engage a plurality of bits without the usual prerequisite of having to line up each bit to an individual receiving hole.

Other objects of this invention will appear from the following description and appended claims, reference being had to the accompanying drawings forming a part of this specification wherein like reference characters designate corresponding parts in the several views.

SUMMARY OF THE INVENTION

The novel structure embodying the teachings of the present invention enables a portable drill bit holder and drill bit presenter to be detachably mounted by frictional engagement in a slot formed in the body of a hand drill. The holder is made of a resilient material such as a hard rubber or TEFLON® plastic, for example. The holder has an elongated oval shaped hole of a fixed depth with a bottom and with two parallel elongated side walls spaced apart a separation distance slightly less than the highest diameter of the plurality of bits to be received in the holder. Inside the hole and lining the wall of the hole is a resilient tube having a length approximately equal to the fixed depth of the hole. The resilient tube is spongy and has a thickness equal to slightly less than one-half of the separation distance between the two parallel elongated side walls. The tube is disposable and replaceable. After the tube is worn by insert and removal of bits between the inside walls thereof and the frictional engagement of the bits by the inside walls, it is designed to be replaced. The tube is held in place by frictional engagement with the side wall of the hole and/or use of an adhesive to bond the tube to hole. Bits are held in place in between the spongy resilient inside wall of the tube. When inserted into the hole the inside wall of the tube is almost pressed together. A slight opening is left to facilitate easy insert of the bits into the holder.

BRIEF DESCRIPTION OF THE DRAWINGS

These and other features, aspects, and advantages of the present invention will become better understood with regard to the following detailed description of a preferred embodiment, appended claims, and accompanying drawings wherein:

FIG. 10 is a perspective of the novel invention holding various bits and mounted in a horizontal slot on a hand drill;

FIG. 11*a* is a perspective view of a drill with a novel improvement to the casing; and, FIG. 11*b* is a front view of the novel improvement in the drill shown in FIG. 11*a*.

DESCRIPTION OF THE PREFERRED EMBODIMENT

Figure 1:
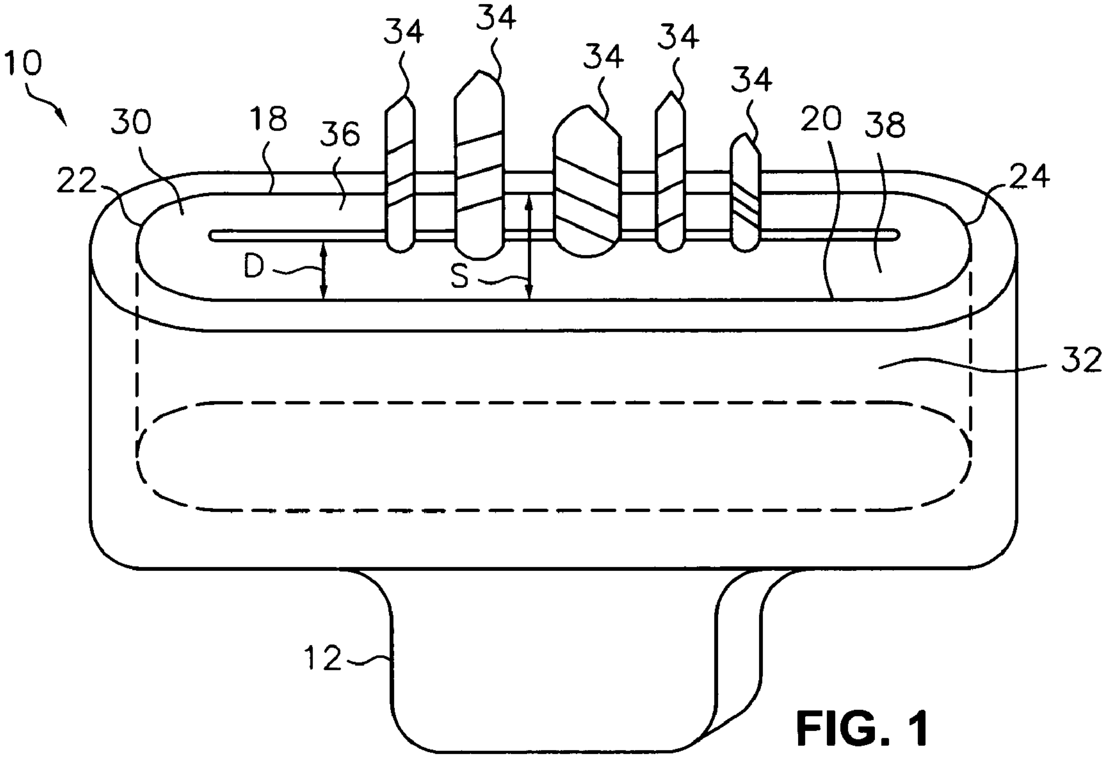
FIG. 1 is a detailed perspective view showing a preferred embodiment of the invention.

In FIG. 1 there is shown a first preferred embodiment of a novel tool bit holder 10. The tool bit holder 10 forms a detachably mountable hand drill bit holder and static presenter apparatus. The apparatus is oblong and made of a compressible flexible resilient material such as rubber, silicone rubber, or plastic, for example. The holder 10 has a tab 12 in the form of a protrusion formed as an integral extension of a bottom of the holder 10. The tab 12 is shaped to tightly fit into a rectangular slot 14, for example, formed in a hand drill 16 such as shown in detail in FIG. 10, for example. The holder 10 has first and second parallel walls 18 and 20, respectively, formed inside the holder 10. The two parallel walls 18 and 20 are joined at each end by two opposing first and second semi-circular walls 22 and 24, respectively, to form a tubular surface interior to the holder 10. Inside the tubular surface formed by the surfaces 18, 20, 22, and 24 there is a thick walled tube 30. The tube 30 has a wall thickness D. The parallel walls 18 and 20 are separated by a distance S. Twice the wall thickness D is selected to be slightly less than the separation distance S. The surface inside the holder 10 forms a blind hole 32. When the tube 30 is inserted into the blind hole 32, the walls of the tube 30 conform and become oval and oblong.

Figure 2:
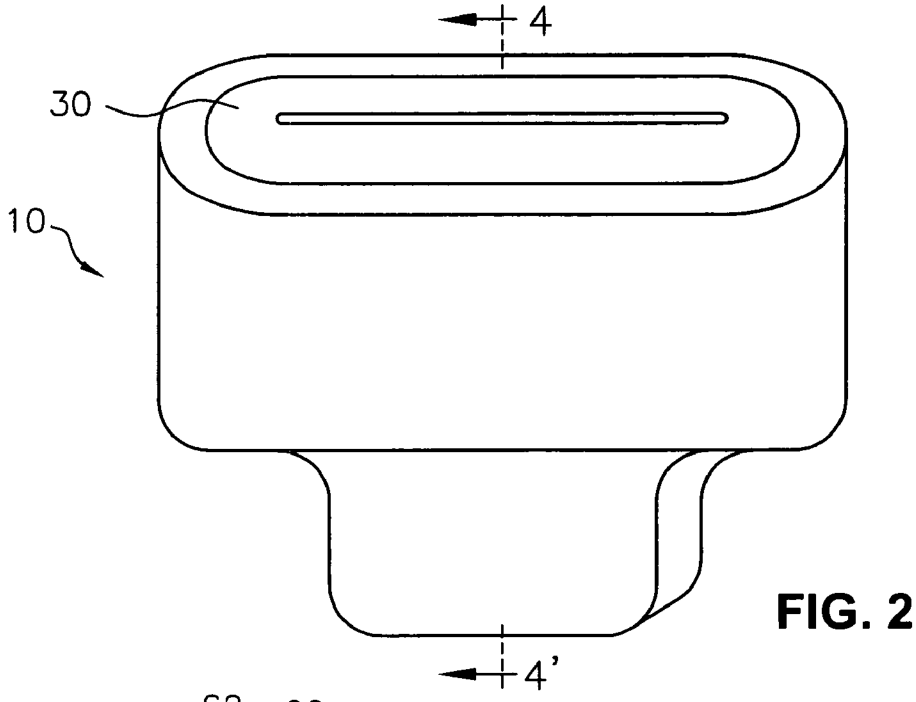
FIG. 2 is a perspective view of the novel tool shown in FIG. 1 with the tool bits shown in FIG. 1 removed.
Figure 3:
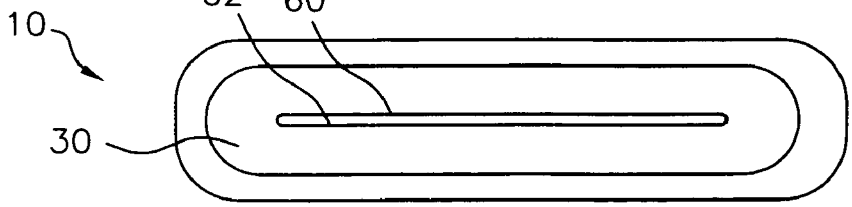
FIG. 3 is a top view of the embodiment shown in FIG. 2.
Figure 5:
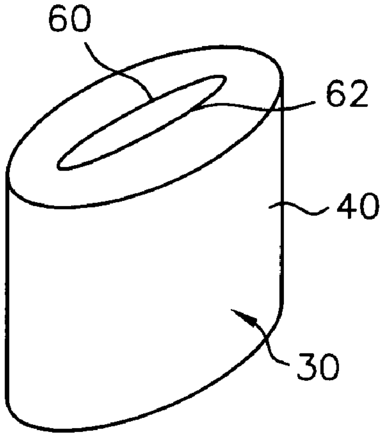
FIG. 5 is a perspective view of a resilient tube insert for the novel invention.
Figure 6:
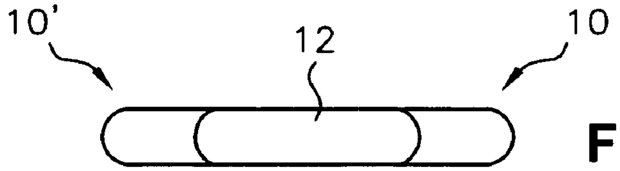
FIG. 6 is a detailed bottom view of the novel invention shown in FIGS. 2 and 8.
Figure 7:
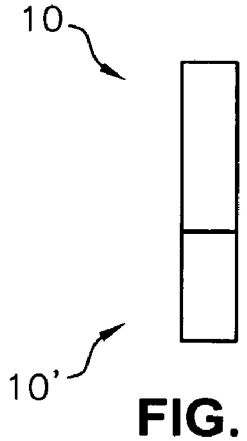
FIG. 7 is a side view of the novel invention shown in FIGS. 2 and 8.

In FIG. 1, the set of bits 34 is shown inserted into the holder 10 and gripped between the inner walls 36 and 38 of the tube 30. The tube 30 has an outside surface 40 as shown in FIG. 5. The tube 30 is made of highly compressible large cell rubber such that the inner surface of the tube 30 grips the bits 34. The tube 30 is gripped sufficiently by the walls 18 and 20 to stay in place in the blind hole 32 of the holder 10. The holder 10 with the tube 30 in place and without bits 34 inserted is shown in FIGS. 2 and 3.

Figure 4:
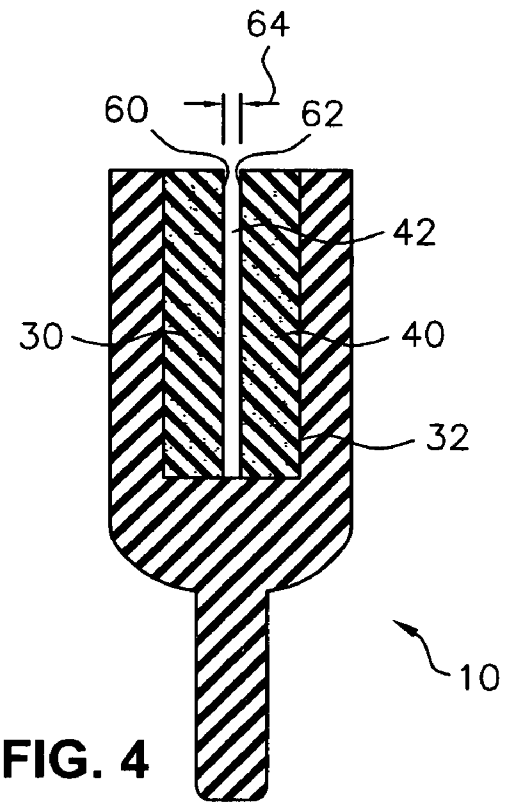
FIG. 4 is another detailed cross-sectional view of the novel invention taken along the plane 4-4' shown in FIG. 2.

A cross-section of the holder 10 with the tube 30 inside is shown in FIG. 4. The cross-section in FIG. 4 is taken along the plane 4-4' illustrated in FIG. 2. In the cross-section there is shown the tube 30 pressed together to form a slot 42 into which bits such as bits 34 may be inserted. The mouth of the slot 42 is rounded to ease insertion of bits therein.

Figure 8:
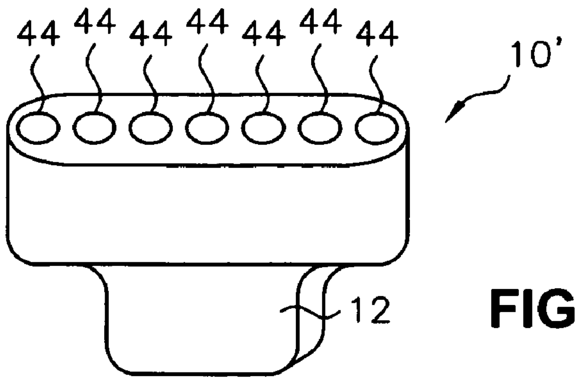
FIG. 8 is a perspective view of another embodiment of the novel invention.
Figure 9:
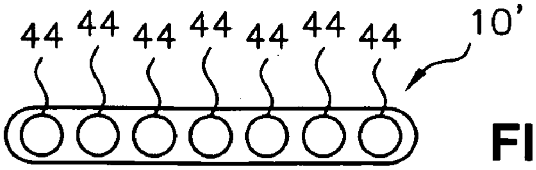
FIG. 9 is a top view of the embodiment of the novel invention shown in FIG. 8.

An alternative embodiment of the invention is shown in FIGS. 8, 9, and 10. There a plurality of apertures 44, either round or hexagonal, is aligned in a single row. The apertures 44 are each sized for specific bits, each aperture 44 being of slightly smaller size so that each matching bit has to be forced into its individual hole for substantial frictional engagement therein. The substantial frictional engagement insures that each bit is retained in its aperture 44 despite substantial vibration from the hand tool or drill. 16 being operated while the bits are stored in the holder.

Moreover, it is an essential feature that this second embodiment has the novel tab 12 for substantial frictional engagement in the slot 14 as shown in FIG. 10. The depth and width of the slot 14 are selected to insure that the novel tab 12 is substantially retained in the slot 14 when the drill 16 is operated with its most severe vibrations, and yet allow the tab 12 to be released only when it is manually pulled away from the drill 16. The crux of this second embodiment is the novel addition of a releasable frictional engagement tab 12 to a linear bit holder 10' for the substantial frictional engagement of the tab 12 in a congruent mated slot 14 formed anywhere in the body of the drill 16, for example as shown in FIG. 10.

The apertures 44 are shown round in shape. For example, the diameter of an aperture for a particular hexagonal bit is made slightly less than the distance between opposite corners of an hexagonal bit to provide a firm frictional engagement of that bit in the assigned receiving aperture 44.

Referring to FIGS. 11*a* and 11*b* there is shown the slot 14. The slot 14 is a novel improvement in the power hand drill 16. The slot 14 provides an affixing means for affixing the holder 10 as shown in FIG. 1 to the hand drill tool 16. The holder 10 is attached to the slot 14 in the hand drill tool 16 by inserting the tab 12 made of a resilient compressible flexible material such as rubber, TEFLON® plastic, or NYLON™ plastic, for example. The hand drill 16 has an electrical motor 46, a chuck 48 adapted to receive a tool bit 50 selected from the plurality of bits 52 (See FIG. 10), and a molded outer body or casing 54.

As shown in FIG. 4, the first and second opposing walls 60 and 62, respectively, of the tube 30 when inserted are separated by the spacing 64. The separation S is equal to twice the thickness D plus the spacing 64.

The parameters S, D, and 64 are determined by the upper and lower limits of the diameters of a set of bits to be held in the holder 10. Another factor is the modulus of compression of the material used for the tube 30 and the holder 10. For the holder to effectively frictionally engage a set of bits with diameters ranging from $B_1$ to $B_N$ where N equals the number of bits in the set, then if $B_1$ is less than $B_N$, the maximum compression of the two walls 36 and 38 of the tube 30 should be equal to or greater than $B_N$. Hence, the compressibility of the material for the tube 30 is selected to be about 50% and the parameter or distance D is equal to or greater than ½ of $B_N$. The parameter 64 should be in range of ½ to ⅓ of $B_1$. With these parameters based in this manner on the diameters of the bits to be held and presented, the need for specific holes for specific bits is eliminated and the oblong aperture or blind hole 32 with the tube 30 inserted can accommodate a plurality of bits 34 having diameters extending over a range without the need to have specific holes or bins for specific bits.

The detachably mountable hand drill tool bit holder and static presenter apparatus shown in FIG. 1 is adapted to receive the plurality of variously sized bits 34 for use with the hand drill tool 16 shown in FIG. 11*a*. The plurality of variously sized bits 34 have diameters that extend over a fixed range. The fixed range is from a small diameter, e.g. 0.5 cm., to a large diameter, e.g. 3.0 cm. Thus, each bit 34 has a diameter in the fixed range. The novel holder 10 is designed and adapted as shown and made out of the compressible resilient flexible material to firmly hold and present the bits 34 for use while frictionally engaged and attached within the novel adaptive slot 14 of the hand drill tool 16. The slot 14 may be oriented vertically or horizontally or at any angle anywhere on the drill 16 by forming the slot 14 in the outer casing 54, for example.

The hand drill tool 16 with the affixing means for affixing the holder 12 to the hand drill tool 16 allows the holder to be attached to the drill tool 16 and forms the holder 12 into a tool bit presentment means for presenting each tool bit 34 with two opposing sides exposed and unobstructed for improved accessibility by a user wearing work gloves, for example. The tab 12 forms an integral frictional engagement means for detachably connecting the holder 10 or apparatus to the affixing means or slot 14. Referring to FIG. 1, the blind hole 32 has the tube 30 therein that forms a frictional bit engagement means for releasably holding anywhere in the blind hole 32 all of the plurality of bits 34. The blind hole 32 is located in holder 10. The holder 10 forms the detachably mountable hand drill tool and static presenter apparatus of the novel invention. The holder 10 or tool presentment means is integrally connected to the slot 14 or integral frictional engagement means.

The blind hole 32 as shown in FIGS. 1,2,3 and 4 has an oval or oblong elongated cross section. The blind hole 32 is formed by first and second parallel elongated opposing side walls 18 and 20 separated by a first distance S. Shown in FIG. 4, a distance 64 representing a separation of the walls 60 and 62 shown in FIG. 3 is less than the small or smallest diameter $B_1$ in the fixed range of diameters that range from diameter $B_1$ to diameter $B_N$ corresponding to the diameters of the bits 34 as shown in FIG. 1. A thick walled tube 30 inside the holder 10 forming the novel apparatus is preferably made entirely of a substantially compressible resilient flexible material such as medium hard rubber. Hard medium cell rubber is molded to form a unitary structure. As shown in FIGS. 3,4, and 5 the inside walls 60 and 62 are compressible, resilient and flexible to a degree where both inside walls having the thickness D can be compressed to the point that the spacing 64 between the parallel side walls 60 and 62 equals a second distance whereby the second distance is equal to the large or largest bit having a diameter $B_N$.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalent steps are, therefore, intended to be embraced by those claims.

| PARTS LIST | |
|---|---|
| tool bit holder | 10 |
| tab | 12 |
| rectangular slot | 14 |
| hand drill | 16 |
| first parallel wall | 18 |
| second parallel wall | 20 |
| first opposing semi-circular wall | 22 |
| second opposing semi-circular wall | 24 |
| thick walled tube | 30 |
| wall thickness | D |
| separation distance | S |
| blind hole | 32 |
| variously sized bits | 34 |
| diameter | $B_1$ |
| diameter | $B_N$ |
| number of bits in set | N |
| first inner wall | 36 |
| second inner wall | 38 |
| outside surface | 40 |
| slot | 42 |
| plurality of apertures | 44 |
| electrical motor | 46 |
| chuck | 48 |
| tool bit | 50 |
| plurality of bits | 52 |
| casing | 54 |
| first inside wall | 60 |
| second inside wall | 62 |
| spacing | 64 |

What is claimed is:

1. A detachably mountable hand drill tool bit holder and static presenter apparatus for a plurality of variously sized bits for use with a hand drill tool, the plurality of variously sized bits having diameters extending over a fixed range from a small diameter to a large diameter, each bit having a diameter in the fixed range, the holder being for use while attached to the hand drill tool, the hand drill tool having an affixing means for affixing the holder to the hand drill tool, comprising:

(a) a tool bit presentment means for presenting each tool bit, each tool bit being presented by the presentment means with two of its opposing sides exposed and said exposed two of its opposing sides unobstructed;

(b) an integral frictional engagement means for detachably connecting the apparatus to said affixing means;

(c) a spacing having a frictional bit engagement means for releasably holding anywhere in the spacing all of the plurality of bits, the spacing being located in the apparatus;

the tool presentment means being integrally connected to the integral frictional engagement means.

2. The detachably mountable hand drill tool bit holder and static presenter apparatus as recited in claim 1 wherein the spacing has an oblong elongated cross section and two parallel elongated opposing side walls separated by a first distance.

3. The detachably mountable hand drill tool bit holder and static presenter apparatus as recited in claim 2 wherein the first distance is less than the small diameter in the fixed range.

4. The detachably mountable hand drill tool bit holder and static presenter apparatus as recited in claim 3 wherein the apparatus is made entirely of a substantially compressible resilient flexible material.

5. The detachably mountable hand drill tool bit holder and static presenter apparatus as recited in claim 4 wherein the compressible resilient material is compressible to a degree wherein when both side walls are compressed the distance between the parallel side walls can equal a second distance, the second distance being equal to the large diameter.

6. The detachably mountable hand drill tool bit holder and static presenter apparatus as recited in claim 3 wherein the spacing is surrounded by a liner made of a resilient compressible flexible material, the liner being a tube, the tube having a wall of a selected thickness, the tube being flattened and inserted in a blind hole to form two parallel elongated opposing side walls separated by a first distance when the liner is uncompressed and separated by a second distance when the liner is compressed, the tube comprising a holding means for engaging and retaining each of the plurality of bits inside the tube within the spacing in the apparatus.

7. The detachably mountable hand drill tool bit holder and static presenter apparatus as recited in claim 6 wherein the compressible resilient material is sufficiently compressible to allow entry into a round blind hole by at least one of the plurality of bits.

8. In a hand drill having an electrical motor, a chuck adapted to receive tool bits, and a molded outer body, the improvement comprising:

A detachably mountable hand drill tool bit holder and static presenter apparatus for a plurality of variously sized bits, having substantially uniform cross-sectional diameters, for use with a hand drill tool, the plurality of variously sized bits having diameters extending over a fixed range from a small diameter to a large diameter, each bit having a diameter in the fixed range, the holder being for use while attached to the hand drill tool, the hand drill tool having an affixing means for affixing the holder to the hand drill tool, comprising:

(a) a tool bit presentment means for presenting each tool bit, each tool bit being presented by the presentment means with two of its opposing sides exposed and said exposed two of its sides unobstructed;

(b) an integral frictional engagement means for detachably connecting the apparatus to said affixing means;

(c) a spacing with a resilient sidewall having a frictional bit engagement means for releasably holding anywhere in the spacing each of the plurality of bits, the spacing being located in the apparatus;

the tool presentment means being integrally connected to the integral frictional engagement means.

9. The improvement as recited in claim 8 wherein the spacing has an oblong elongated cross section and two parallel elongated opposing side walls separated by a first distance.

10. The improvement as recited in claim 9 wherein the first distance of the spacing is less than the small diameter in the fixed range.

11. The improvement as recited in claim 10 wherein the apparatus is made entirely of a substantially compressible resilient flexible material.

12. The improvement as recited in claim 11 wherein the compressible resilient material around the spacing is compressible to a degree wherein when both side walls are compressed by a bit, the distance between the parallel side walls can equal a second distance, the second distance being equal to the large diameter.

* * * * *